J. J. COMER.
MULTIPLEX TRANSMITTER.
APPLICATION FILED APR. 7, 1909.
943,915.
Patented Dec. 21, 1909.
2 SHEETS—SHEET 2.
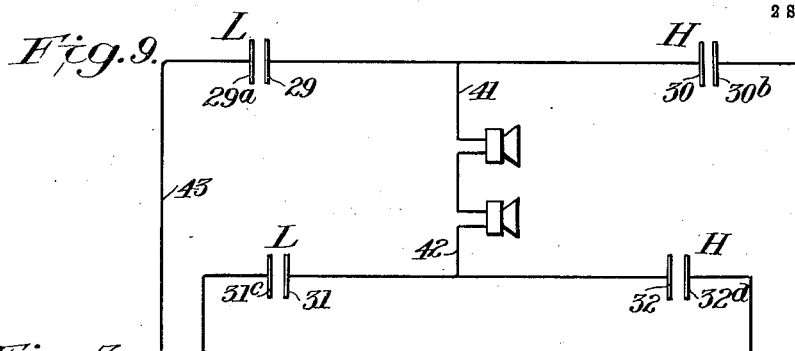
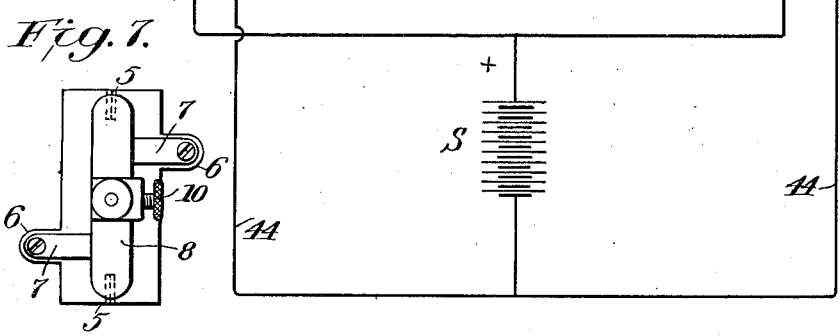
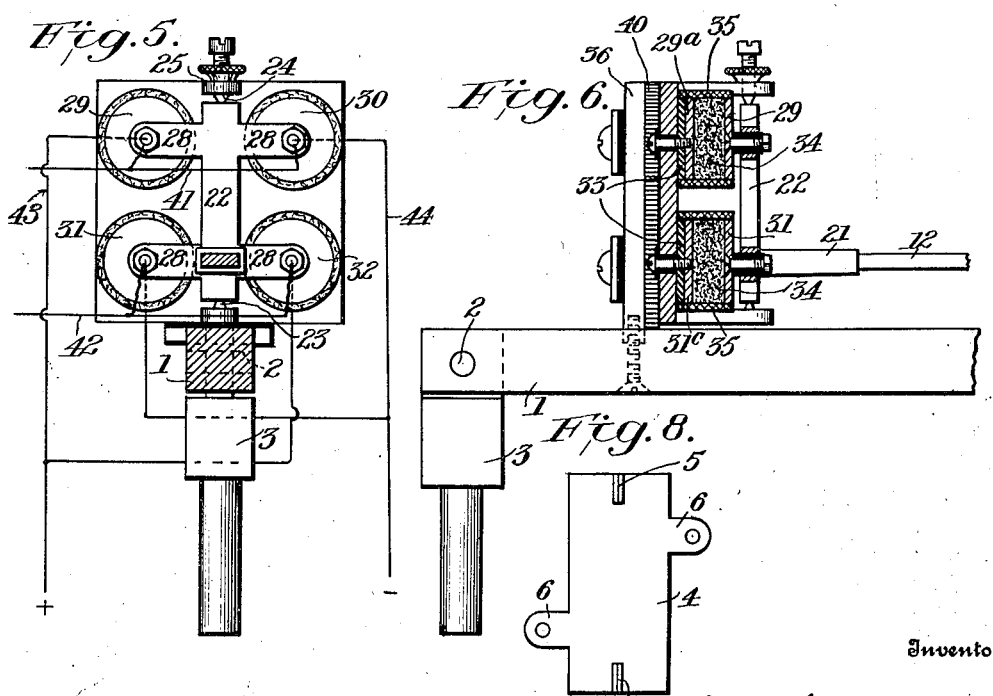
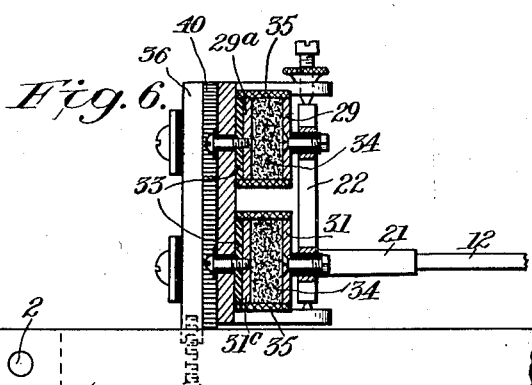
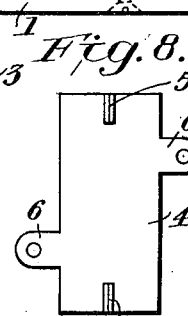

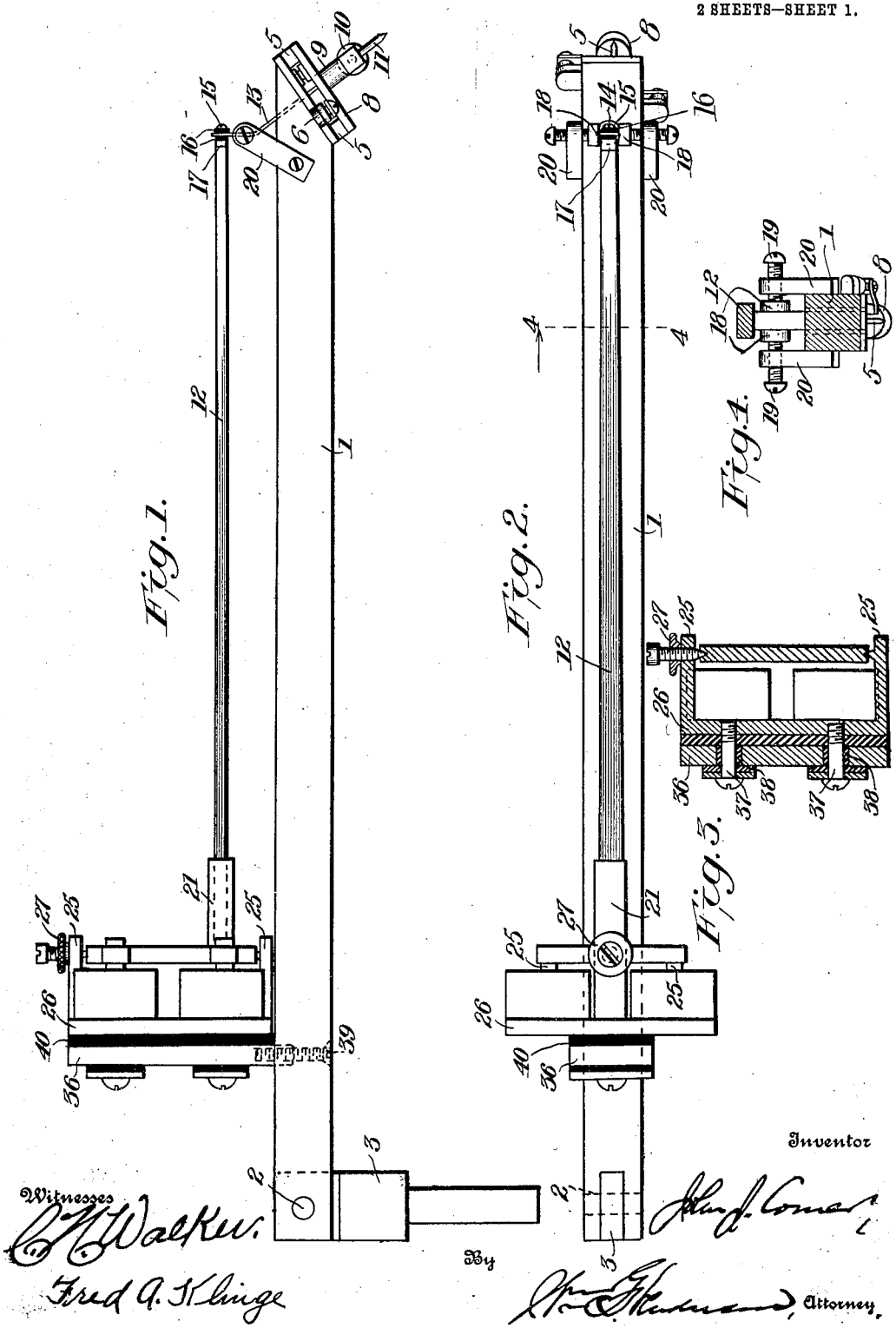

UNITED STATES PATENT OFFICE.

JOHN J. COMER, OF BALTIMORE, MARYLAND, ASSIGNOR TO GEORGE R. WEBB, OF BALTIMORE, MARYLAND.

MULTIPLEX TRANSMITTER.

943,915.  Specification of Letters Patent.  Patented Dec. 21, 1909.

Application filed April 7, 1909. Serial No. 488,431.

*To all whom it may concern:*

Be it known that I, JOHN J. COMER, a citizen of the United States, residing at Baltimore, in the county of Baltimore and State of Maryland, have invented certain new and useful Improvements in Multiplex Transmitters; and I do declare the following to be a full, clear, and exact description of the invention, such as will enable others skilled in the art to which it appertains to make and use the same. reference being had to the accompanying drawings, and to the letters and figures of reference marked thereon, which form a part of this specification.

My invention relates to transmitters for use in the transmission of vibrations, such for instance as the telephone transmission of sound vibrations. It is particularly adapted for the transmission of musical vibrations, especially where the vibrations are taken from a record. It is not however confined to the illustration given but in scope comprises whatever use to which it may be applied where the same results are sought to be attained.

It has for its object to transform the transmitted vibrations into undulatory alternating electrical currents whose variation in value corresponds to the original vibrations. For illustration, it transforms the vibrations made upon a record, for instance, a gramophone disk, into undulatory alternating electrical currents whose variation in value will correspond to the original vibrations from which the record is made. The transmitter is multiplex in form or character, and the invention is based on the discovery which I have made by a number of experiments that the amplitude of the vibrations recorded on disks is a number of times greater, say from ten to forty times greater, than granular carbon will properly respond to, and this has led me to devise a multiplex transmitter which will successfully produce the desired reduction of the amplitude of vibration to give the results sought. The form of the transmitter which I have found to give the best results comprises, broadly stated, a lever which serves as an inertia bar which is supported so as to have a vertical and a lateral movement, and carrying at one end a vibrator provided with a tracer to receive the vibrations from a record, and a second lever connected at one end with the vibrator and at the other end with the electrodes of the transmitter supported from the inertia bar toward its rear end, the vibrations received by the vibrator from the record in the amplitude and frequency derived from it being transmitted to the lever connected with the electrodes and by said lever and inertia bar reduced in amplitude and corresponding to the original vibrations from which the record was made. I also contemplate using in connection with the transmitter a circuit in which when a movement is impressed on the tracer of the vibrator in one direction a reduced resistance is produced in two of the carbon receptacles and an increased resistance in the other two carbon receptacles so that the current is transmitted through the high resistance receptacles to the subscribers' lines, while when the impressed movement of the tracer is in the opposite direction the converse is true and the effect on all the carbon electrodes is reversed; thus the points of sending the current over the subscribers' lines from the pairs of carbon electrodes in alternation, become alternately positive and negative, and an undulatory alternating current whose variation corresponds to the original vibration made upon the record, is discharged over the subscribers' line.

The foregoing are some of the principal features of the invention, although there are other features, all of which will be hereinafter indicated and described and then sought to be clearly defined by the claims, reference being had to the accompanying drawings forming a part hereof, in which—

Figure 1 is a side elevation of the transmitter; Fig. 2 is a plan view of the same; Fig. 3 a vertical section on a central line between the transmitters; Fig. 4 a cross section on the line 4—4 of Fig. 2; Fig. 5 a front view of the group of individual transmitters forming a portion of the multiplex transmitter, with the electrode actuating lever and inertia bar in cross section; Fig. 6 a side view of Fig. 5 with two of the carbon holding cups in section; Fig. 7 a front view of the vibrator and its knife edge supporting plate; Fig. 8 a front view of the knife edge plate; and Fig. 9 a diagrammatic view of the circuit.

In the drawings, the numeral 1 designates what will be termed an inertia bar formed, say of metal, and pivotally connected at its rear end in any suitable manner, say by a pivot pin 2, to a post 3 so as to have a vertical movement, the lower part of the post being cylindrical so as to fit in a bracket or other support (not shown) attached to a wall or otherwise, so as to be free to turn laterally, the inertia bar thus being capable of moving vertically and laterally. To the front end of the inertia bar is attached a vibrator which may be of the type ordinarily used in connection with gramophone disks and consisting of a plate 4 having knife edge bearings 5 and side lugs 6 to which are attached the side spring arms 7 of a vibrating plate 8 from which extends a post 9 to which is connected by a thumb screw 10 a needle or tracer 11 designed to trace or follow the undulations of the record. This vibrator I support from the front end of my inertia bar by suitably attaching the knife edge plate of the vibrator to the inclined face of the bar as indicated in Figs. 1 and 2 of the drawing.

The vibrator is connected resiliently to the forward end of a transmitting lever 12 by means of a yielding or spring plate 13 which at one end is attached to the vibratable member of the vibrator so as to receive vibrations therefrom and transmit them to the lever. The plate or strip 13 passes through an opening 14 in the inertia bar and has its upper end attached to the transmitting lever by a screw 15, there being preferably elastic washers 16 at the point of attachment, and the end of the lever being preferably provided with a metallic cap 17, the transmitting lever preferably being made of wood. Against the opposite edges of the strip 13 rubber washers 18 are caused to bear, the same being held in place by set screws 19 passing through arms 20 extending from the inertia bar. These washers serve as dampers so that while the strip is yielding or resilient it is steadied or given firmness in its vibrations. I have found that the best results are attained if the length of the strip from the point of its attachment to the transmitting lever to the point of its attachment to the vibrator is approximately one and one-half times as great as the length of the vibrating member from the point of attachment of the strip thereto to the end of the needle which contacts with the record.

The rear end of the transmitting lever is connected with the carbon electrodes of the individual transmitters which are supported from or carried by the inertia bar at a point approximately two inches, more or less, from the rear end of the inertia bar, for the best results. The rear end of the lever is connected by a socket 21 to what may be designated a spider 22 fulcrumed by pivots 23 and 24 to the overhanging arms 25 of a plate 26, preferably of brass, and one of the pivots may be a threaded pin provided with a jam-nut 27 to hold it to its adjustment. The spider is formed with four lateral arms 28 to which are connected carbon buttons 29, 30, 31 and 32 constituting the front electrodes of four granular carbon transmitters. The rear electrodes consisting of the carbon buttons 29$^a$ 30$^b$, 31$^c$ and 32$^d$, are supported from the plate 26 and insulated therefrom by a suitable insulating substance 33, and between the front and rear electrode of each transmitter is the granular carbon 34 which is held in place by the cups 35 attached to the rear carbon buttons and which may be of felt or other material. The plate 26 is supported from a plate 36, preferably of brass, by screws 37 insulated by material 38 from the plate, the plate 36 being attached by a screw 39, or otherwise, to the inertia bar. The plate 26 is insulated from the plate 36 by a strip of rubber 40, preferably pure or soft rubber, so as to prevent as far as possible the low rate vibration set up in the inertia bar being communicated to the granular carbon in the cups or receptacles.

The inertia bar serves to relieve the granular carbon in the cups or receptacles of the transmitters from undue disturbance arising from vibrations derived through the tracer in contact with the revolving record while at the same time the bar may move laterally to conform to the movements given to the vibrator by the undulations of the record, and may have also a vertical movement to accommodate any surface irregularities in the plane of the record. The carbon transmitters being carried by the inertia bar are allowed the same movements as the bar without the carbon granules being unduly disturbed, and even the low rate vibration set up in the inertia bar is to a large extent if not entirely prevented from being transmitted to the granular carbon by the cushion in the form of soft rubber interposed between the rear plate of the carbon cups and the plate supporting the same from the inertia bar. At the same time the amplitude of the vibrations derived from the record is so reduced by the transmitting lever of the electrodes that they are transformed into vibrations whose variation in value corresponds to the original vibrations from which the record was made, and thus the vibrations are brought within the range of the responsive capacity of the carbon granules.

When this multiplex transmitter is used in connection with a proper electric circuit there will be transmitted over the line an undulatory electrical current whose variation in value corresponds to the original vibrations from which a record was made, and thus the transmitter is rendered of special value in the telephonic transmission of musical or other reproduced vibrations. I have devised a circuit specially well adapted for use in connection with this transmitter and while claim is made to the same, yet the transmitter described is not confined in its use to the circuit which will be described. The circuit which I prefer is as follows. The front electrodes 29 and 30 of the multiplex transmitter are legged to the branch wire 41 of the line, and the front electrodes of the other pair of individual transmitters are legged to the branch wire 42 of the line. The rear electrode 29ª of one transmitter is connected by wire 43 with the rear electrode 32ᵈ of one of the transmitters as shown, and the wire 43 is connected to a suitable source of current S. The rear electrode 31ᶜ of another transmitter is connected by wire 44 with the rear electrode 30ᵇ of the remaining transmitter as shown and this wire 44 is connected with the source of current. Thus a transmitter of one pair of transmitters legged to the line is connected to one of the other pair of transmitters legged to line in such manner that movement impressed in one direction by the record on the tracer needle will produce a reduced resistance in the transmitters having the electrodes 29, 31 and an increased resistance in the transmitters having the electrodes 30, 32, thus sending the current over the line from the electrodes having for the time the increased resistance. When the movement of the tracer pin is in the opposite direction the resistance will be reduced in the transmitters previously having the high resistance but now having a reduced resistance and the current will be passed over the line from the transmitters which now have the increased resistance but previously had the reduced resistance. The points of discharge of the current over the line thus alternately change from positive to negative and an undulatory alternating current is discharged over the line whose variation corresponds to the original vibration recorded on the record.

A central station will be provided with any desired number of these multiplex transmitters, and each instrument will have a number of subscribers' lines connected therewith, the line of each subscriber being provided with a suitable switch at the central station so that any particular subscriber or number of subscribers may be connected with the central dispensing station whenever desired, the switch not being shown because it may be of any suitable type and does not constitute a part of the present invention.

Having described my invention and set forth its merits, what I claim is:—

1. A telephone instrument comprising a vibrating member to receive vibrations from a record, an electrode to receive vibrations communicated from said vibrating member, and a lever for reducing the amplitude of the vibrations transmitted from the vibrating member to the electrode, substantially as described.

2. A telephone instrument comprising a member to receive vibrations from a record, an electrode to receive vibrations communicated from said vibrating member, a lever for reducing the amplitude of the vibrations transmitted from the vibrating member to the electrode, and an inertia bar carrying said member, electrode and lever, substantially as described.

3. In a telephone instrument, a holder for granular carbon, a bar carrying a tracer to receive vibrations from a record, and means for reducing in amplitude and transmitting to the carbon in the holder vibrations derived from the record.

4. In a telephone instrument, a holder for granular carbon, and means for reducing in amplitude and transmitting to the carbon in the holder vibrations derived from a record.

5. A telephone instrument including an inertia bar and a lever connected therewith for reducing the amplitude of received vibrations during their transmission by the instrument, substantially as described.

6. A telephone instrument including a laterally movable inertia bar carrying a vibration receiving member, and a lever connected with said bar, for receiving vibrations and reducing their amplitude of vibration after being received, substantially as described.

7. A telephone instrument including a laterally and vertically movable inertia bar carrying a vibration receiving member, and a lever connected with said bar, for receiving vibrations and reducing their amplitude of vibration after being received, substantially as described.

8. A telephone instrument including an inertia bar carrying a vibration receiving member, a reducing lever carried by said bar, and a resilient connection between said lever and the vibration receiving member carried by the inertia bar, said parts coöperating to receive and reduce the vibrations derived through the vibration receiving member, substantially as described.

9. A telephone instrument including an inertia bar carrying a vibration receiving member, a reducing lever carried by said bar, a resilient connection between said lever and the vibration receiving member, and cushioning dampers acting upon said resilient connection, said parts coöperating to receive and reduce the vibrations derived through the vibration receiving member, substantially as described.

10. A telephone instrument including a plurality of individual transmitters, and a lever capable of responding to and reducing in amplitude received vibrations and operating to increase and reduce the resistance in the individual transmitters in alternation, reciprocally to the received vibrations, substantially as described.

11. A telephone instrument, including an inertia bar, a plurality of individual transmitters carried by said bar, and a lever capable of responding to received vibrations and operating to increase and reduce the resistance in the individual transmitters in alternation, reciprocally to the received vibrations, substantially as described.

12. A telephone instrument, including an inertia bar, a plurality of individual transmitters carried by said bar, a cushion intermediate of said bar and transmitters to minimize the transmission of vibration from the bar to the transmitters, and a lever capable of responding to received vibrations and operating to increase and reduce the resistance in the individual transmitters in alternations, reciprocally to the received vibrations, substantially as described.

13. A telephone instrument, including an inertia bar, a plurality of individual transmitters carried by said bar, an oscillating member connected with electrodes of the individual transmitters, and a lever connected with said oscillating member and capable of responding to received vibrations, and operating through said oscillating member to increase and reduce the resistance in the individual transmitters in alternation, reciprocally to the received vibrations, substantially as described.

14. A telephone instrument, comprising a reciprocable inertia bar carrying at one end a vibration receiving member, a plurality of individual transmitters supported upon the inertia bar, and a reducing lever connected at one end with the vibration receiving member of the inertia bar and with electrodes of the individual transmitters, said lever operating to transmit to the electrodes of the individual transmitters vibrations received from the vibration receiving member of the inertia bar, reduced in amplitude, and increasing and reducing the resistance in the individual transmitters in alternation, responsively to the received vibrations, substantially as described.

15. In a telephone instrument, a group of transmitters, a circuit in which the transmitters are included, some of the transmitters being in one branch of the circuit and others in a separate branch, and each branch leading to line, means for increasing the resistance in the transmitters of one branch and reducing the resistance in the transmitters of the other branch, to discharge a positive and a negative current to line from the branches, in alternation, and means for reducing in amplitude and conveying to the transmitters vibrations derived from a record.

In testimony whereof I affix my signature in presence of two witnesses.

JOHN J. COMER.

Witnesses:
   CARY D. HALL, Jr.,
   WM. H. MARTIN.